(12) United States Patent
Hafner

(10) Patent No.: US 8,007,230 B2
(45) Date of Patent: Aug. 30, 2011

(54) TURBINE SEAL PLATE ASSEMBLY

(75) Inventor: Matthew Troy Hafner, Greenville, SC (US)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 12/652,166

(22) Filed: Jan. 5, 2010

(65) Prior Publication Data
US 2011/0163506 A1   Jul. 7, 2011

(51) Int. Cl.
*F01D 11/00* (2006.01)
*F01D 5/32* (2006.01)

(52) U.S. Cl. ............. 415/173.7; 415/174.5; 416/220 R; 416/221

(58) Field of Classification Search ............. 415/173.7, 415/174.4, 174.5; 416/219 R, 220 R, 221, 416/248
See application file for complete search history.

(56) References Cited

U.S. PATENT DOCUMENTS

| | | | |
|---|---|---|---|
| 3,266,770 A | 8/1966 | Harlow | |
| 3,501,249 A | 3/1970 | Scalzo et al. | |
| 3,644,058 A * | 2/1972 | Barnabei et al. | 416/95 |
| 3,733,146 A | 5/1973 | Smith et al. | |
| 3,814,539 A | 6/1974 | Klompas | |
| 4,480,958 A | 11/1984 | Schlechtweg | |
| 4,507,052 A | 3/1985 | Thompson | |
| 4,659,285 A | 4/1987 | Kalogeros et al. | |
| 4,846,628 A | 7/1989 | Antonellis | |
| 4,854,821 A * | 8/1989 | Kernon et al. | 416/95 |
| 5,211,407 A * | 5/1993 | Glynn et al. | 277/632 |
| 5,800,124 A | 9/1998 | Zelesky | |
| 6,086,329 A | 7/2000 | Tomita et al. | |
| 6,189,891 B1 | 2/2001 | Tomita et al. | |
| 7,238,008 B2 * | 7/2007 | Bobo et al. | 416/220 R |
| 7,371,044 B2 | 5/2008 | Nereim | |
| 7,500,832 B2 | 3/2009 | Zagar et al. | |
| 2007/0014668 A1 | 1/2007 | Engle | |
| 2007/0080505 A1 | 4/2007 | Nereim | |
| 2008/0050245 A1* | 2/2008 | Cloarec | 416/97 R |
| 2009/0148298 A1* | 6/2009 | Strohl et al. | 416/219 R |

* cited by examiner

*Primary Examiner* — Justine Yu
*Assistant Examiner* — Jesse Prager
(74) *Attorney, Agent, or Firm* — Sutherland Asbill & Brennan LLP

(57) ABSTRACT

A seal plate assembly for use with a rotor wheel assembly of a turbine engine. The seal plate assembly may include a seal plate positioned about a rim of a rotor wheel. The seal plate may include a number of seal plate segments and a number of locking pins extending through the seal plate segments and into the rim of the rotor wheel.

17 Claims, 4 Drawing Sheets

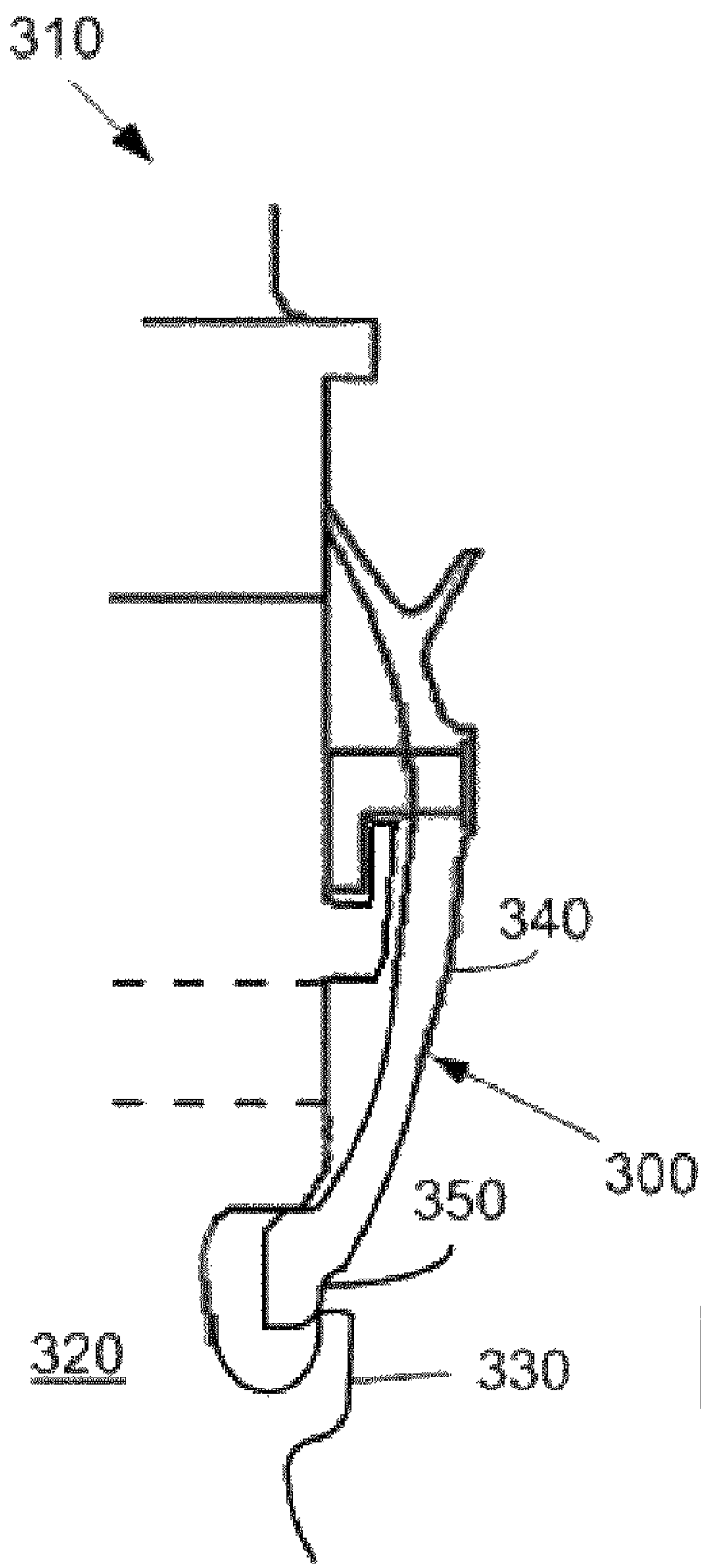

US 8,007,230 B2

TURBINE SEAL PLATE ASSEMBLY

TECHNICAL FIELD

The present application relates generally to gas turbine engines and more particularly relates to a gas turbine seal plate assembly used to shield turbine components from the hot gas path and to ensure bucket retention.

BACKGROUND OF THE INVENTION

A turbine wheel assembly of known gas turbine engines generally includes a number of axially spaced rows of turbine blades separated by rows of stationary turbine vanes and the like. Gas turbine engine efficiency and part life may be related in part to the ability to shield effectively the rim area of the turbine wheels and other elements. A seal plate may be used to minimize the exposure of the turbine wheel to the hot combustion gases and also to minimize the leakage of air that is used to cool the turbine blades. Due to the harsh, high temperature environment in which the seal plates are positioned, however, the seal plates may be susceptible to buckling and other types of deformation. Moreover, known seal plates may be difficult and/or time consuming to install and/or replace.

There is therefore a desire for improved seal plate assembly designs and methods of installing the same. The seal plate assembly preferably will provide effective shielding and sealing from the hot gas path while also being easy to install and replace.

SUMMARY OF THE INVENTION

The present application thus provides a seal plate assembly for use with a rotor wheel assembly of a turbine engine. The seal plate assembly may include a seal plate positioned about a rim of a rotor wheel. The seal plate may include a number of seal plate segments and a number of locking pins extending through the seal plate segments and into the rim of the rotor wheel.

The present application further provides a method of sealing rotor wheel assembly from hot combustion gases. The method may include positioning a number of seal plate segments about a rim of a rotor wheel, positioning a number of locking pins through the seal plate segments and into the rim of the rotor wheel, and locking the seal plate segments into place about the rim of the rotor wheel by rotating the locking pins into one or more axial protrusions in the rim of the rotor wheel.

The present application further provides a rotor wheel assembly for use with a turbine engine. The rotor wheel assembly may include a turbine blade, a turbine vane, and a seal plate assembly secured to a rim of a rotor wheel about the turbine blade. The seal plate assembly may include one or more wing seals extending towards the turbine vane.

These and other features and improvements of the present application will become apparent to one of ordinary skill in the art upon review of the following detailed description when taken in conjunction with the several drawings and the appended claims.

BRIEF DESCRIPTION OF THE DRAWINGS

FIG. 7 is a side view of a portion of a rotor wheel assembly with an alternative embodiment of a seal plate assembly as is described herein.

DETAILED DESCRIPTION

Figure 1:
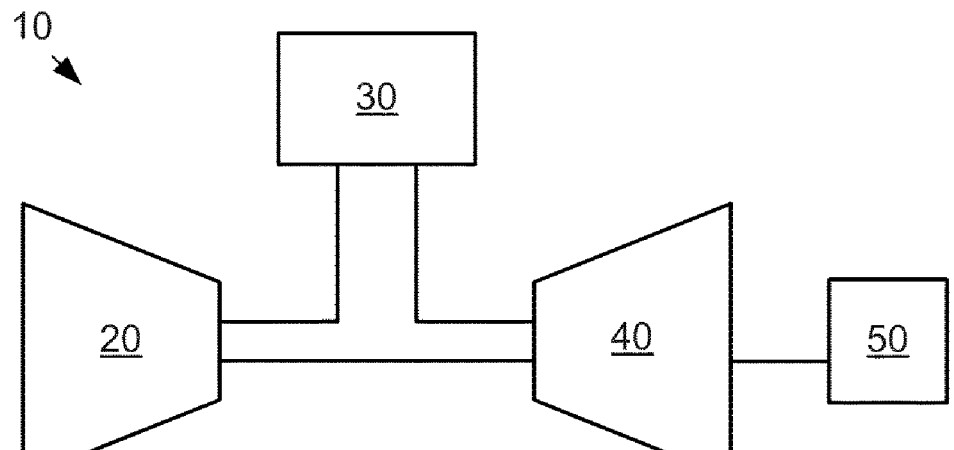
FIG. 1 is a schematic view of a gas turbine engine.

Referring now to the drawings, in which like elements are referred to by like numerals throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a compressed flow of fuel and ignites the mixture. Although only a single combustor 30 is shown, the gas turbine engine 10 may include any number of combustors 30. The hot combustion gases are in turn delivered to a turbine 40. The hot combustion gases drive the turbine 40 so as to produce mechanical work. The mechanical work produced by the turbine 40 drives the compressor 20 and an external load 50 such as an external generator and the like.

The gas turbine engine 10 may use natural gas, various types of syngas, and other types of fuels. The gas turbine engine 10 may be a heavy duty gas turbine model offered by General Electric Company of Schenectady, N.Y. The gas turbine engine 10 may have other configurations and may use other types of components. Other types of gas turbine engines 10 may be used herein. Multiple gas turbine engines, other types of turbines, and other types of power generation equipment also may be used herein together. The present application also may be applicable to steam turbines, aircraft, and other types of rotating equipment.

Figure 2:
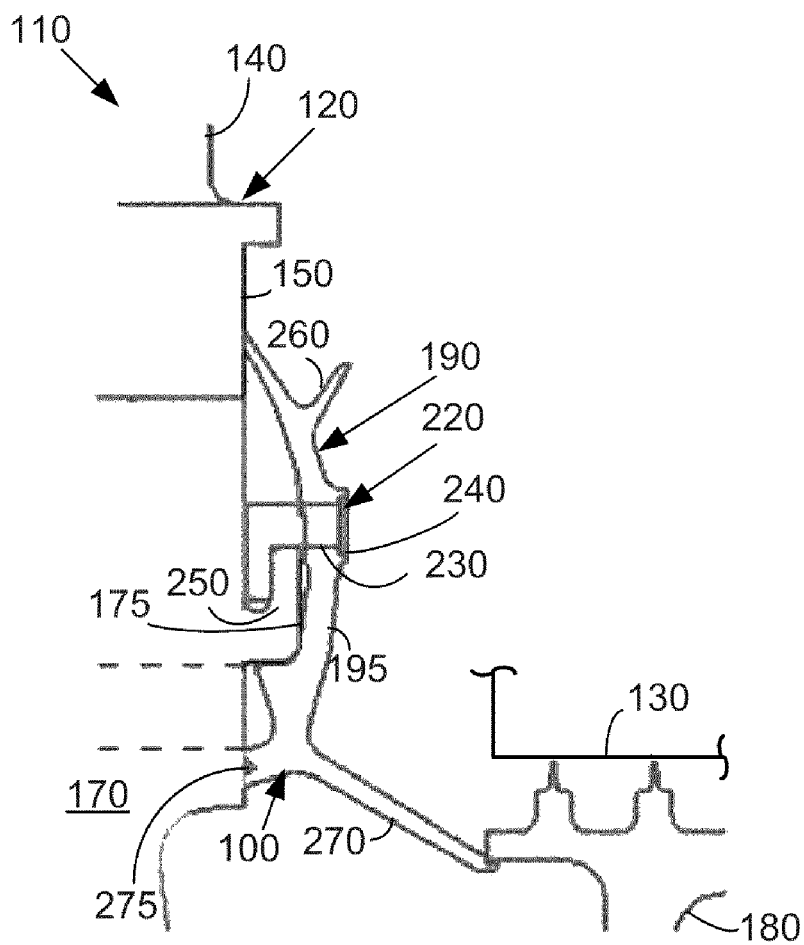
FIG. 2 is a side view of a portion of a rotor wheel assembly with the seal plate assembly as is described herein.

FIG. 2 shows a seal plate assembly 100 as may be described herein. The seal plate assembly 100 may be positioned within a rotor wheel assembly 110. The rotor wheel assembly 100 includes a number of turbine blades 120 and turbine vanes 130 (only one of each is shown). Each turbine blade 120 may include an airfoil 140, a shank 150, a dovetail 160, and the like. The turbine blade 120 may be positioned about a rotor wheel 170 via the dovetail 160. The turbine vanes 130 may be positioned about the turbine shell (not shown) and otherwise secured. The turbine vanes 130 may extend towards a labyrinth seal 180 or otherwise.

Figure 3:
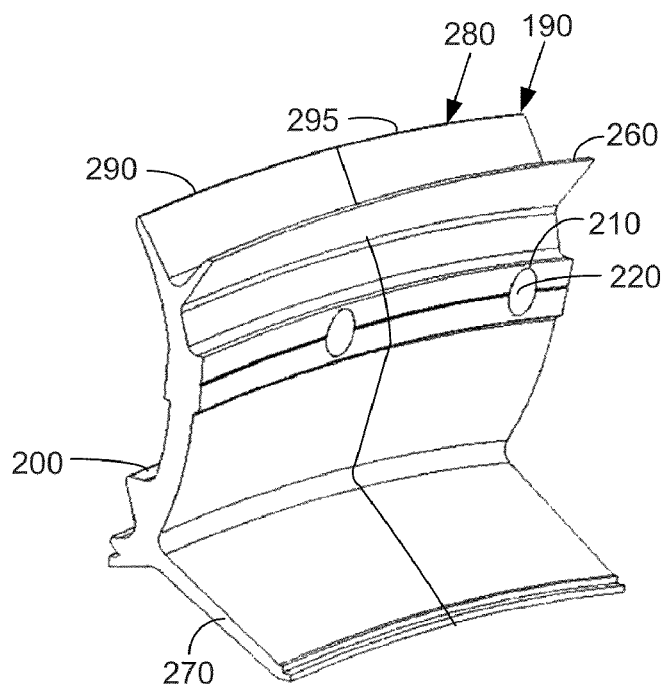
FIG. 3 is a front perspective view of the seal plate of the seal plate assembly of FIG. 2.
Figure 4:
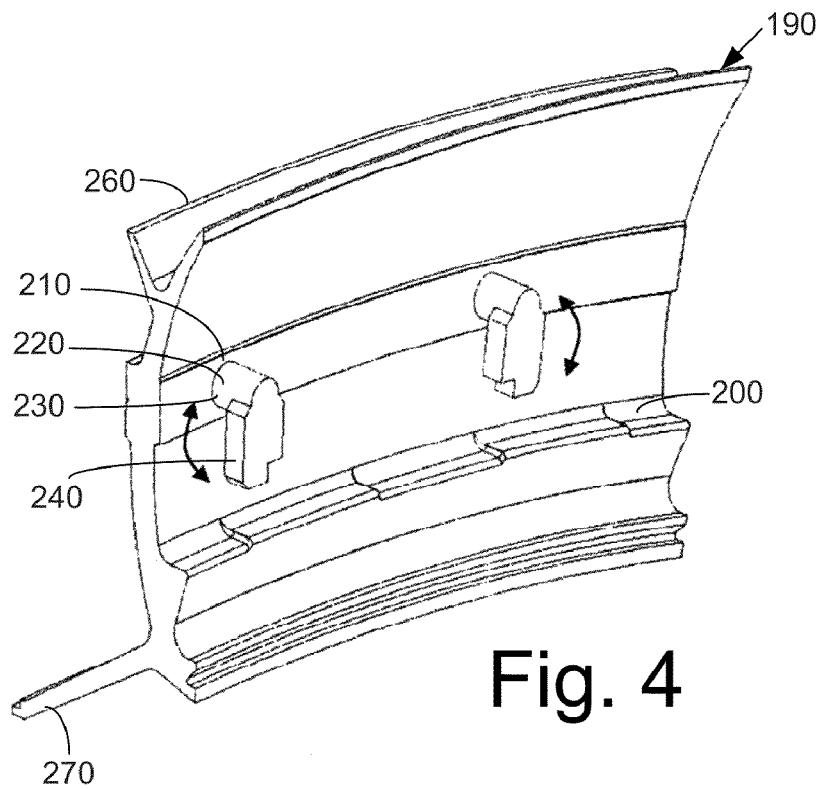
FIG. 4 is a rear perspective view of the seal plate of the seal plate assembly of FIG. 2.

FIGS. 3 and 4 show examples of the seal plate assembly 100. The seal plate assembly 100 includes a seal plate 190 as is shown. The seal plate 190 may include a curved body 195. The curved body 195 largely conforms to a rim 175 of the rotor wheel 170. Other shapes may be used herein. For example, a straight body may be used, but may be heavier. The inside of the curved body 195 may include a number of loading pads 200. The loading pads 200 may accommodate the rim 175 of the rotor wheel 170. Other shapes may be used herein.

The seal plate 190 may include a number of staking slots 210. The staking slots 210 extend through the body 195 of the seal plate 190. The seal plate assembly 100 may include a number of locking pins 220 for use with the staking slots. Each locking pin 220 may include a rod 230 that extends through the body 195 and a flange 240. The flange 240 fits within an axial protrusion or lug 250 positioned about the rotor wheel 170 so as to maintain the seal plate 190 in place. The axial protrusions 250 also may be positioned about the axial surface below the live rim of the rotor wheel 170. The locking pins 220 may be rotated in opposite directions for installation on the rotor wheel 170, rotated into the locking position, and staked into place. The pins may be installed and removed with a screw driver and the like.

The seal plate 190 also may include a number of seal wings. In this case, an upper seal wing 260 and a lower seal wing 270. The upper seal wing 260 may extend toward the turbine vane 130 while the lower seal wing 270 may extend towards and beneath the labyrinth seal 180. The seal wings 260, 270 help isolate the rim cavity from the hot gas path. Other types of seals and other types of configurations may be used herein. A wire seal 275 also may be used about the seal wings 260, 270 and the like. Other types of seals may be used herein.

Referring again to FIG. 3, the seal plate 100 may be in the form of a number of segments 280. In this example, a first segment 290 and a second segment 295 are shown although any number of segments 280 may be used. The use of the segments 280 provides for easy installation and removal. The segments 290 also may overlap so as to reduce leakage therethrough. The seal plate 190 may be made out of a nickel alloy and the like. Other types of materials may be used herein.

Figure 5:
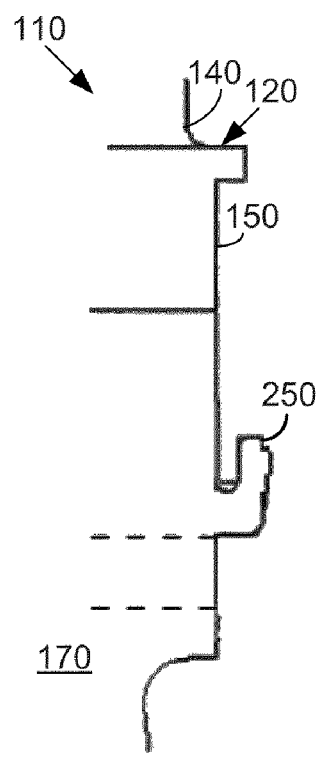
FIG. 5 is a side view of a bucket with a lug as may be used herein.
Figure 6:
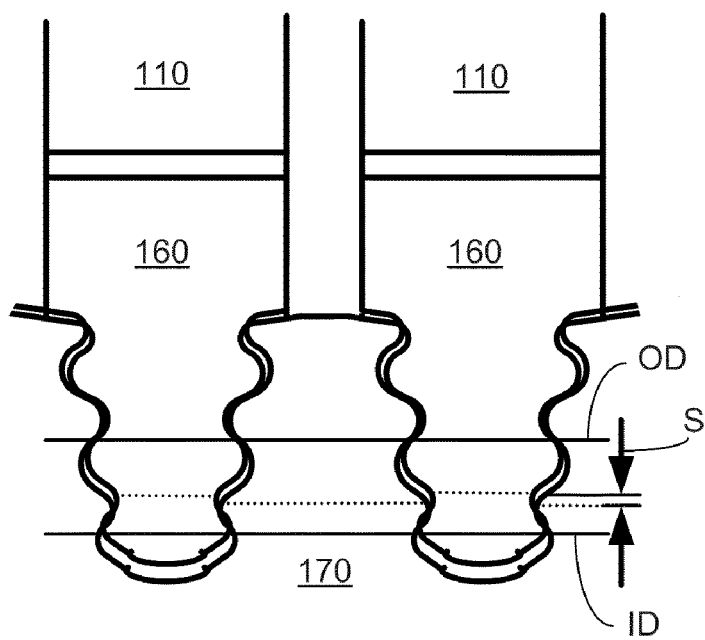
FIG. 6 is a side view of a number of buckets and a rotor wheel as may be used herein.

As is shown in FIGS. 5 and 6, the lug 250 on the rotor wheel assembly 110 includes an outside diameter ("OD") and an inside diameter ("ID"). The inside of the lug 250 is at a higher radius than the pins 220 and provide a step S. The use of the higher radius largely stops the rotation of the pins 220. The pins 220 are mirror images of each other. Once rotated, and staked into place, the pins 220 prevent the seal plate 100 from sliding around the wheel 170 circumferentially. Likewise, the shear through the pin 220 provides bucket axial retention.

In use, each segment 280 of the seal plate 190 of the seal plate assembly 100 is positioned about the rotor wheel 170. Each segment 280 is axially attached via the locking pins 200 positioned about the staking slots 210 and into the axial protrusions 250. As above, the locking pins 220 may be rotated in opposite directions on the rotor wheel 170, rotated into the locking position, and staked in place. The locking pins 220 thus retain the seal plate 190 in place, provide bucket axial retention, and prevent circumferential movement of the seal plate 100 about the rotor wheel 170. The overall seal plate assembly 100 thus shields the shank 150 and the rotor wheel 170 from the hot combustion gases that emanate from the hot gas path. The seal plate assembly 100 also retains the turbine blades 120 in the rotor wheel 170 in the axial direction.

The seal plate assembly 100 thus may improve overall gas turbine efficiency by reducing the amount of cooling air leakage from the bucket/turbine wheel interface. Further, the upper and lower seal wings 260, 270 seal the rim cavity from hot gas ingestion and also may reduce the amount of the required wheel space purge flow. The use of the locking pins 220 allows for ease of installation and hence ease of maintenance.

FIG. 7 shows an alternative steel plate assembly 300. The seal plate assembly 300 may be used with an alternative rotor wheel assembly 310 and an alternative wheel 320. In this case, a lug 330 may be positioned within the wheel 320. Likewise, the seal plate assembly 300 includes a curved body 340. The curved body 340 extends into a lower flange 350. The lower flange 350 may fit within the lug 330 so as to directly attached the seal plate assembly 300 to the wheel 320. Other configurations may be used herein. This embodiment may or may not use the loading pads 200, the lower seal 27, or similar types of structures.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:

1. A seal plate assembly for use with a rotor wheel assembly, comprising
    a seal plate positioned about a rim of a rotor wheel;
    the seal plate comprising a plurality of seal plate segments; and
    a plurality of locking pins extending through the number of seal plate segments and into the rim of the rotor wheel wherein the rim comprises an axial protrusion and each one of the plurality of locking pins comprises a flange integrally formed as one piece and positioned within the axial protrusion.

2. The seal plate assembly of claim 1, wherein the seal plate comprises a curved body.

3. The seal plate assembly of claim 1, wherein the seal plate comprises a plurality of loading pads for positioning about the rim of the rotor wheel.

4. The seal plate assembly of claim 1, wherein each of the plurality of seal plate segments comprises a staking slot therethrough and wherein one of the plurality of locking pins is positioned within the staking slot.

5. The seal plate assembly of claim 1, wherein each of the plurality of locking pins comprises a rod and the flange.

6. The seal plate assembly of claim 1, wherein the seal plate comprises one or more seal wings extending therefrom.

7. The seal plate assembly of claim 6, wherein the one or more seal wings comprise an upper seal wing and a lower seal wing.

8. The seal plate assembly of claim 1, wherein the seal plate comprises a nickel alloy.

9. A method of sealing a rotor wheel assembly from hot combustion gases, comprising:
    positioning a plurality of seal plate segments about a rim of a rotor wheel;
    positioning a plurality of locking pins through the plurality of seal plate segments and into the rim of the rotor wheel wherein each of the locking pins comprise a flange integrally formed as one piece; and
    locking the plurality of seal plate segments into place about the rim of the rotor wheel by rotating the flanges of the plurality of locking pins into one or more axial protrusions in the rim of the rotor wheel.

10. The method of claim 9, further comprising staking the plurality of locking pins into position.

11. A rotor wheel assembly for use with a turbine engine, comprising:
    a turbine blade and a turbine vane; and
    a seal plate assembly secured to a rim of a rotor wheel about the turbine blade by a plurality of locking pins wherein each of the locking pins comprise a flange integrally formed as one piece;
    wherein the seal plate assembly comprises one or more wing seals extending towards the turbine vane wherein the rim comprises an axial protrusion and wherein each one of the plurality of locking pins comprises the flange positioned within the axial protrusion.

12. The rotor wheel assembly of claim 11, wherein the seal plate assembly comprises a plurality of seal plate segments.

13. The rotor wheel assembly of claim 10, wherein each of the plurality of seal plate segments comprises a staking slot therethrough and wherein one of the plurality of locking pins is positioned within the staking slot.

14. The rotor wheel assembly of claim 11, wherein the seal plate assembly comprises a curved body.

15. The rotor wheel assembly of claim 11, wherein the seal plate assembly comprises a plurality of loading pads for positioning about the rim of the rotor wheel.

16. The rotor wheel assembly of claim 11, wherein the one or more wing seals comprises an upper seal wing and a lower seal wing.

17. The rotor wheel assembly of claim 11, wherein the seal plate assembly comprises a nickel alloy.

* * * * *